US009623334B2

(12) United States Patent
Anderson et al.

(10) Patent No.: US 9,623,334 B2
(45) Date of Patent: Apr. 18, 2017

(54) OBJECT MAPPING TECHNIQUES FOR MOBILE AUGMENTED REALITY APPLICATIONS

(71) Applicant: INTEL CORPORATION, Santa Clara, CA (US)

(72) Inventors: Glen J. Anderson, Beaverton, OR (US); Subhashini Ganapathy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 14/560,064

(22) Filed: Dec. 4, 2014

(65) Prior Publication Data
US 2015/0279109 A1    Oct. 1, 2015

Related U.S. Application Data

(63) Continuation of application No. 12/976,660, filed on Dec. 22, 2010, now Pat. No. 8,913,085.

(51) Int. Cl.
*A63F 13/65* (2014.01)
*G06T 19/00* (2011.01)
(Continued)

(52) U.S. Cl.
CPC .............. *A63F 13/65* (2014.09); *A63F 13/10* (2013.01); *A63F 13/12* (2013.01); *A63F 13/34* (2014.09);
(Continued)

(58) Field of Classification Search
CPC ..... G06T 19/006; A63F 13/65; A63F 2300/69
See application file for complete search history.

(56) References Cited

U.S. PATENT DOCUMENTS

2002/0094189 A1    7/2002   Navab et al.
2006/0038833 A1    2/2006   Mallinson et al.
(Continued)

FOREIGN PATENT DOCUMENTS

EP    1710002    10/2006
EP    1744280    1/2007
(Continued)

OTHER PUBLICATIONS

Reiner Wichert, Collaborative Gaming in a Mobile Augmented Reality Environment, 2002, in EUROGRAPHICS-Ibero-American Symposium in Computer Graphics—SIACG 2002 Proceedings, 7 pages.*

(Continued)

*Primary Examiner* — Jeffery A Brier
(74) *Attorney, Agent, or Firm* — Blakely, Sokoloff, Taylor & Zafman LLP

(57) ABSTRACT

Techniques are disclosed that involve mobile augmented reality (MAR) applications in which users (e.g., players) may experience augmented reality (e.g., altered video or audio based on a real environment). Such augmented reality may include various alterations. For example, particular objects may be altered to appear differently. Such alterations may be based on stored profiles and/or user selections. Further features may also be employed. For example, in embodiments, characters and/or other objects may be sent (or caused to appear) to other users in other locations. Also, a user may leave a character at another location and receive an alert when another user/player encounters this character. Also, characteristics of output audio may be affected based on events of the MAR application.

20 Claims, 12 Drawing Sheets

(51) Int. Cl.

| | | |
|---|---|---|
| *A63F 13/52* | (2014.01) | |
| *H04N 5/262* | (2006.01) | |
| *A63F 13/40* | (2014.01) | |
| *A63F 13/30* | (2014.01) | |
| *G06K 9/46* | (2006.01) | |
| *G06T 19/20* | (2011.01) | |
| *G09G 5/00* | (2006.01) | |
| *H04N 5/44* | (2011.01) | |
| *A63F 13/34* | (2014.01) | |
| *A63F 13/92* | (2014.01) | |
| *H04N 21/414* | (2011.01) | |
| *H04N 21/422* | (2011.01) | |
| *H04N 21/4223* | (2011.01) | |
| *H04N 21/431* | (2011.01) | |
| *H04N 21/44* | (2011.01) | |
| *H04N 21/472* | (2011.01) | |
| *H04N 21/4788* | (2011.01) | |
| *H04N 21/658* | (2011.01) | |
| *H04N 21/433* | (2011.01) | |
| *H04N 21/478* | (2011.01) | |

(52) U.S. Cl.
CPC .............. *A63F 13/52* (2014.09); *A63F 13/92* (2014.09); *G06K 9/46* (2013.01); *G06T 19/006* (2013.01); *G06T 19/20* (2013.01); *G09G 5/003* (2013.01); *H04N 5/2621* (2013.01); *H04N 5/44* (2013.01); *H04N 21/41407* (2013.01); *H04N 21/4223* (2013.01); *H04N 21/42202* (2013.01); *H04N 21/431* (2013.01); *H04N 21/44012* (2013.01); *H04N 21/4788* (2013.01); *H04N 21/47205* (2013.01); *H04N 21/6582* (2013.01); *A63F 2300/204* (2013.01); *A63F 2300/406* (2013.01); *A63F 2300/5573* (2013.01); *A63F 2300/6018* (2013.01); *A63F 2300/6676* (2013.01); *A63F 2300/69* (2013.01); *A63F 2300/8082* (2013.01); *G09G 2370/16* (2013.01); *H04N 21/4332* (2013.01); *H04N 21/4781* (2013.01)

(56) References Cited

U.S. PATENT DOCUMENTS

| | | |
|---|---|---|
| 2007/0132785 A1 | 6/2007 | Ebersole, Jr. |
| 2008/0071559 A1 | 3/2008 | Arrasvuori |
| 2008/0094417 A1 | 4/2008 | Cohen |
| 2009/0117890 A1 | 5/2009 | Jacobsen et al. |
| 2010/0271367 A1* | 10/2010 | Vaden ................... A63F 13/10 345/420 |
| 2010/0289817 A1 | 11/2010 | Meier et al. |
| 2010/0321540 A1 | 12/2010 | Woo et al. |
| 2012/0092328 A1 | 4/2012 | Flaks et al. |
| 2012/0206452 A1 | 8/2012 | Geisner et al. |
| 2012/0229509 A1 | 9/2012 | Liu |
| 2012/0242865 A1 | 9/2012 | Vartanian et al. |
| 2012/0290950 A1 | 11/2012 | Rapaport et al. |

FOREIGN PATENT DOCUMENTS

| | | |
|---|---|---|
| EP | 1814101 | 8/2007 |
| KR | 2006-0100983 | 9/2006 |
| KR | 2010-0014198 | 2/2010 |
| TW | M366583 | 10/2009 |
| WO | WO-2005/116806 | 12/2005 |

OTHER PUBLICATIONS

European Search Report for EP Counterpart Application No. 11850557.7, 9 pgs., (Oct. 21, 2015).
Taiwan Search Report for TW Counterpart Application No. 100147150, 1 pgs., (Jun. 9, 2015).
PCT Search Report, PCT/US2011/064450, Intel Corpotation et al., Int. Filing date Dec. 12, 2011, 11 pages.

* cited by examiner

800

| Object | MAR | Basis | Capability | Appear Rules | Status | ... |
|---|---|---|---|---|---|---|
| Bush | Bush | Real | Non-interactive | On detection | Act | ... |
| Tree | Tower | Real | Non-interactive | On detection | Act | ... |
| Car | Jeep | Real | Non-interactive | On detection | Act | ... |
| Small truck | Jeep | Real | Non-interactive | On detection | Act | ... |
| Large truck | Mobile Rocket | Real | Non-interactive | On detection | Act | ... |
| Adult male | Soldier | Real | Non-interactive | On detection | Act | ... |
| Adult female | Soldier | Real | Non-interactive | On detection | Act | ... |
| Child | None | Out | ... | ... | ... | ... |
| ... | | | | | | |

| ID $902_1$ | Class $902_2$ | Basis $902_3$ | Location $902_4$ | Capability $902_5$ | Appear Rules $902_6$ | Status $902_7$ | Strength $902_8$ |
|---|---|---|---|---|---|---|---|
| 0000001 | Player | Real | 45.519615, -122.865431 | Player | | Act | 80% |
| 0000002 | Player | Real | 45.519615, -122.865436 | Player | 03182010.1500, 000001 present | Act | 20% |
| 0000003 | Monster | Virtual | 45.519615, -122.865451 | Attacker | | Act | 80% |
| 0000004 | Shield | Virtual | 45.519615, -122.865439 | Solid | | Act | 43% |
| 0000005 | Monster | Virtual | 45.519615, -122.865435 | Blocker | 03182010.1500, 000001 present | Dormant | 100% |
| 0000006 | Gun | Real | 45.519615, -122.865436 | Basic | | Act | 100% |
| 0000007 | Gun | Virtual | 45.519615, -122.865438 | High | | Act | 100% |
| 0000008 | Wand | Real | 45.519615, -122.865439 | All | | Act | 4% |
| 0000009 | Shield | Real | 45.519615, -122.865434 | Basic | | Act | 80% |
| 0000010 | Monster | Virtual | 45.519615, -122.865436 | Attacker | 03182010.1500, 000001 present | Dormant | 100% |
| 0000011 | Tank | Real | 45.519615, -122.865431 | Basic | Object recog. Match | Act | 80% |
| ⋮ | ⋮ | ⋮ | ⋮ | ⋮ | ⋮ | ⋮ | ⋮ |

OBJECT MAPPING TECHNIQUES FOR MOBILE AUGMENTED REALITY APPLICATIONS

RELATED APPLICATIONS AND CLAIM OF PRIORITY

This application is a continuation application and claims the benefit to and priority of U.S. patent application Ser. No. 12/976,660, entitled "Object Mapping Techniques for Mobile Augmented Reality Applications", by Glen J. Anderson, et al., filed Dec. 22, 2010, now allowed, the entire contents of which are incorporated herein by reference.

BACKGROUND

Mobile augmented reality (MAR) applications provide users with a view of an actual environment that is superimposed with virtual elements (referred to herein as "MAR objects"). Such MAR applications may include games, such as battlefield simulations.

During MAR application performance, users (e.g., players) may be mobile and view an augmented environment through their respective display devices. Moreover, users of such devices may interact with each other, as well as with objects provided by the MAR application. Such interactions may include aiming and shooting virtual ballistics at targets (e.g., virtual objects, and/or other players).

Currently, challenges exist in providing augmented reality to multiple users, and in the management of information associated with such augmented reality.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 8 is a diagram showing an exemplary object profile database implementation;

FIG. 9 is a diagram showing an exemplary character profile database implementation.

DETAILED DESCRIPTION

Figure 1:
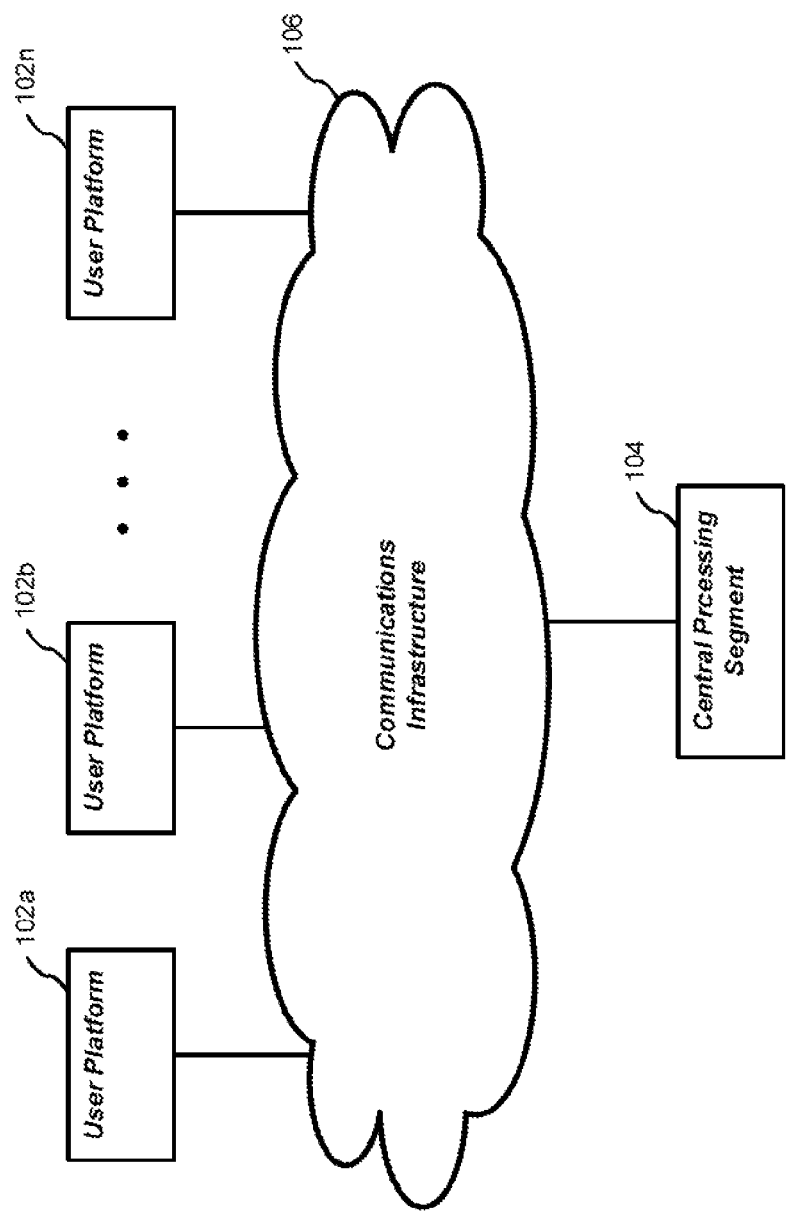
FIG. 1 is a diagram of an exemplary operational environment.

Embodiments provide techniques that may be employed by a mobile augmented reality (MAR) application. For instance, in embodiments, users (e.g., players) may experience augmented reality (e.g., altered video or audio based on a real environment). Such augmented reality may include various alterations. For example, particular objects may be altered to appear differently (or to be removed from view). Additionally or alternatively, objects may be augmented with features or properties that allow the users to get more information about the objects. For instance, such objects may be automatically recognized and altered based on a corresponding profile.

Moreover, such alterations may occur based on the actions of a user. For instance, a user may pick up a real object (e.g., a stick) and cause it to become a different MAR object (e.g., a gun). Accordingly, this object will be altered so that users will view it as the different MAR object.

Further features may also be employed. For example, in embodiments, characters and/or other objects may be sent (or caused to appear) to other users in other locations. Also, a user may leave a character at another location and receive an alert when another user/player encounters this character.

Also in embodiments, communications (e.g., audio communications) may occur among groups of users (such as teams of players). Characteristics of such communications may be altered or stopped based on various events. For example, an attack by one team may interrupt (or "break") the communications capability of the attacked team. Also, such communications may be enhanced with virtually audible events from the game.

Further, in embodiments, two or more users may interact with a MAR object. Based on this, the results of such interactions may be shown on that MAR object. For example, in a gaming application, the results of multiple players' inputs may be shown at the same virtual target.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in One or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

FIG. 1 is a diagram of an exemplary environment 100 in which the techniques described herein may be employed. This environment includes a plurality of user platforms 102a-n, a central processing segment 104, and a communications infrastructure 106. These elements may be implemented in any combination of hardware and/or software.

Together, the elements of FIG. 1 may perform operations associated with a MAR application. A battlefield gaming simulation is an example of a MAR application. In such an application, a simulated battle environment may be based on a real environment that a user is viewing on a display. The user may then virtually shoot at virtual targets on the screen. Moreover, such applications may show characters superimposed over that environment. In turn, the user may interact with these characters.

A shopping application is a further MAR application example. In such an application, a user may view a shopping mall live on a display device (e.g., on a handheld screen).

Through the employment of MAR techniques, information regarding various stores in the shopping mall may be superimposed on the display. For example, such information may include names of the stores and/or details regarding sales going on at particular stores.

Each of user platforms 102a-n is associated with a particular user or participant in the MAR application. Also, each of user platforms 102a-n may be portable and travel with its user. Through these user platforms, a user may perceive (e.g., see and/or hear) an augmented reality.

For instance, each of user platforms 102a-u may include a display device that can display views of the augmented reality, as generated by the MAR application. This augmented reality may be based on a user's current perspective (e.g., the user's current location and orientation) within a real environment. More particularly, the user may view, from his/her current perspective, a real environment that is altered. Such alterations may include any combination of changes to the appearances of real objects, the removal of real objects from view, the addition of virtual (non-real) objects, as well as the display of information. For example, users may be augmented to appear as corresponding avatars. Such avatar-based augmentations may include overlaying different features (e.g., clothing, uniforms, body features, etc.) on image(s) of a user.

Further, each of user platforms 102a-n may include audio input and output devices. Through such devices, a user may receive audio that augments the real environment. The MAR application may attribute such audio to altered real object(s), virtual object(s), and/or other users (and/or their character objects). Further, a user may send audio to be outputted at a different user platform. Also, through such devices, users may engage in audio (e.g., voice communications with each other) with the ability to engage in audio communications with each other. Such communications may be across logical channels or "bands". Characteristics of these bands (e.g., their efficacy) may be affected by events of the MAR application.

Each of user platforms 102a-n may also include one or more input devices that allow its user to interact with a MAR application. Exemplary input devices include (but are not limited to) keypads, keyboards, and touch screens (e.g., implemented through user output device 206), handheld remote controls, gesture-based control devices, and/or voice-activated control devices that may employ speech recognition techniques.

The augmented reality described herein may be based on various factors. For instance, the augmented reality provided to a user of one of user platforms 102a-n may be based on the user's own actions, on the actions of another user (e.g., another player), and/or on operations automatically initiated by the MAR application.

Central processing segment 104 may provide information and operations that are employed by each of user platforms 102a-n. For example, central processing segment 104 may maintain information or data that is distributed to each of user platforms 102a-n. However, in embodiments, such information may be maintained by each of user platforms 102a-n in a distributed manner. Accordingly, information updates may cause communications so that user platforms 102a-n have current information. In such cases, central processing segment 104 may operate as an intermediary for the exchange of information between user platforms 102a-n. Moreover, central processing segment 104 may perform various application operations. Such operations may involve characteristics and interactions between MAR objects.

Communications infrastructure 106 provides for the exchange of information among user platforms 102a-n and central processing segment 104. In embodiments, communications infrastructure 106 may include one or more communications networks. These networks may be any combination of wired and/or wireless network(s). For example, communications infrastructure 106 may include any combination of wireless data networks, cellular networks, satellite networks, direct video broadcasting networks, wired telephony networks, cable television networks, the Internet, and so forth.

As described herein, users of user platforms 102a-n may perceive a real environment that is augmented in accordance with the MAR application. This augmenting may involve various alterations, as described herein. For example, the MAR application may alter the appearance of a person or thing to take on attributes, as assigned by a profile. Alternatively, unwanted objects could be removed from a user's view so as not to interfere with the applications. Thus, objects, such as people, cars, buildings, roads, bodies of water, bridges, trees, etc. may all have profiles to make them—to user(s)—appear and act in certain ways. Moreover, in embodiments, a profile of an object may be different for different users, games, or instances or sessions of the same application (e.g., the same game title).

Further, a user may send or leave objects (e.g., characters as as other objects) at locations that are remote to him/her. When another user encounters such an object, the user may automatically receive a notification of the encounter. Also, communication can be automatically initiated between users (or between users and their avatars) when interaction (e.g., play) with another person is initiated.

Further, during operation, two or more users may interact with a MAR object. In turn, the results (or impact) of such interactions on the objects may be shown to the users. For example, the combined results of two game players' virtual missile shots on a MAR object may be shown to both players.

Figure 2:
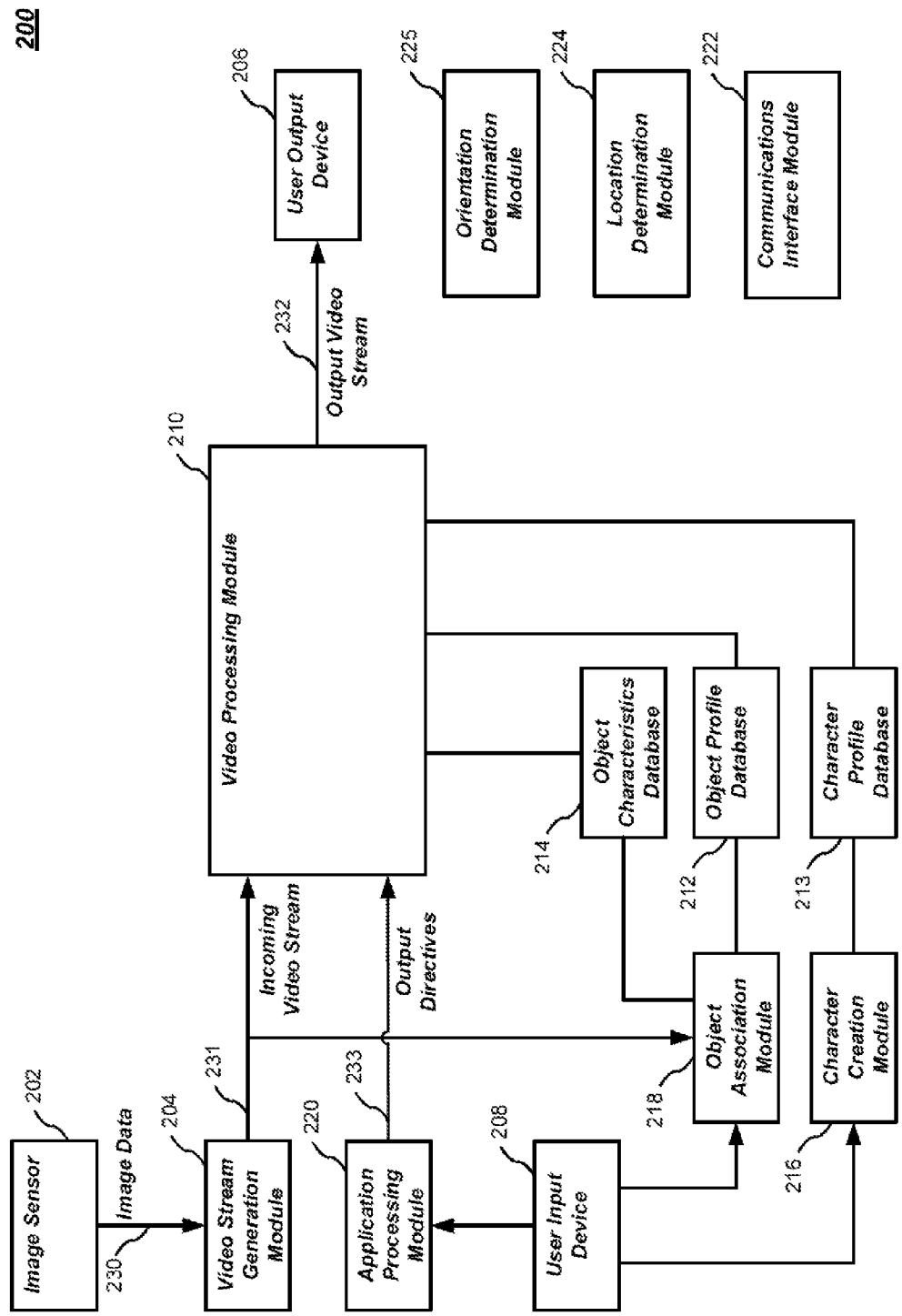
FIG. 2 is a diagram of an exemplary implementation that may be included in a user platform.

FIG. 2 is a diagram showing an exemplary implementation 200 that may be included in one or more of user platforms 102a-n. As shown in FIG. 2, implementation 200 may include an image sensor 202, a video stream generation module 204, a user output device 206, a user input device 208, a video processing module 210, an object profile database 212, a character profile database 213, and an object characteristics database 214. Also, implementation 200 may include a character creation module 216, an object association module 218, an application processing module 220, a communications interface module 222, a location determination module 224, and an orientation determination module 225. The elements of FIG. 2 may be implemented in any combination of hardware and/or software.

Image sensor 202 captures images of a real environment. In turn, these images are passed to video stream generation module 204 as image data 230. Image data 230 may comprise intensity values (e.g., in color or monochrome) for a plurality of pixels. This data may be represented in various analog and/or digital formats.

In embodiments, image sensor 202 may be attached to the corresponding user. For example, it may be head-mounted or affixed to the user's apparel. Alternatively, image sensor 202 may be handheld or mounted on an input device such as a toy gun. Embodiments, however, are not limited to these examples.

Video stream generation module 204 generates an incoming video stream 231 based on image data 230. In embodiments, this may involve performing various operations, including (but not limited to) analog-to-digital conversion, encoding, and/or compression.

FIG. 2 shows that incoming video stream 231 is sent to video processing module 210. In turn, video processing module 210 produces an output video stream 232. As described herein, output video stream 232 may convey alterations to objects identified within incoming video stream 231. Additionally or alternatively, output video stream 232 may include renderings as indicated by directives 233 that are received from application processing module 220. Such alterations and/or renderings may be overlaid onto incoming video stream 231 to produce output video stream 232. Alternatively, output video stream 232 may include such alterations and/or renderings in isolation of incoming video stream 231.

As shown in FIG. 2, output video stream 232 is sent to user output device 206. User output device 206 may be of various device types that provide visual and/or audiovisual output. For example, user output device 206 may include a video display that renders an output video stream 232. In this case, output video stream 232 may include alterations and/or renderings overlaid onto incoming video stream 231.

In fluffier embodiments, user output device 206 may include a transparent projection surface. During operation, the user may view the real environment (as opposed to a video of the real environment) through this transparent surface. In this case, output video stream 232 may include alterations and/or renderings in isolation of video stream 231. Thus, such alterations and/or renderings of output video stream 232 may be projected onto the surface.

In embodiments, user output device 206 may be attached to its user. For example, user output device 206 may be head-mounted or affixed to the User's apparel. Alternatively, user output device 206 may be handheld. Embodiments, however, are not limited to these examples.

User input device 208 allows the user to interact with a MAR application. Thus, through user input device 208, the user may participate in real-time with events of the MAR application. For example, in a tactical gaming application, the user may aim and shoot at various MAR objects. Also, user input device 208 provides for the user to generate profile information. Such information may involve created characters and/or associations between real objects and MAR objects.

In embodiments, such user interaction features may involve user input device 208 operating in coordination with a graphical user interface that is displayed by user output device 206. User input device 208 may be implemented with one or more devices. Exemplary devices include (but are not limited to) keypads, keyboards, and touch screens (e.g., implemented through user output device 206), handheld remote controls, gesture-based control devices, and/or voice-activated control devices that may employ speech recognition techniques.

Object profile database 212 includes information regarding various objects associated with a MAR application. Examples of such objects include persons, vehicles, landscape objects (e.g., trees, shrubs, rocks, sticks, etc.), buildings, and so forth. In embodiments, object profile database 212 may indicate whether alterations should be made for certain objects that are detected in incoming video stream 231. Details regarding an exemplary implementation of object profile database 212 are provided below with reference to FIG. 8.

Character profile database 213 includes information regarding characters that may be employed in a MAR application. In embodiments, characters include objects (e.g., beings and/or items) that are associated with and controlled by users (such as a user's avatar). Alternatively, characters may be objects (e.g., beings and/or items) automatically controlled by the MAR application. Details regarding an exemplary implementation of character profile database 213 are provided below with reference to FIG. 9.

Object characteristics database 214 includes information regarding the characteristics of various objects. For example, object characteristics database 214 may include features for one or more objects. Such feature data may be generated through image processing and/or object recognition techniques. Thus, such feature data may be used for identifying real objects that are detected in incoming video stream 231. The generation of feature data may be initiated by a user (for example, through user interaction with object association module 218). Alternatively or additionally, such feature data may be received from a remote entity (e.g., central processing segment 104 of FIG. 1).

In embodiments, information (e.g., profiles) in databases 212, 213, and/or 214 may be generated by a local user or a remote user. Moreover, such profiles may be generated before or during the occurrence of MAR events (e.g., before or during a game). Thus, profiles of individual objects may be selected and changed during a game. Further, in embodiments, automatic learning may occur in which certain types of objects (e.g., objects within a given locality) may be categorized to be altered in a different way in the future. In embodiments, this may involve the performance of one or more heuristics. Such learning features may be provided by application processing module 220.

Character creation module 216 allows a user to create characters for employment in a game application. In embodiments, character creation module 216 includes control logic (e.g., software) that provides for the user to input various traits of a new character. In turn, such traits may be stored in character profile database 213.

As described herein, display data may be modified such that real life objects are replaced with MAR objects. Object association module 218 allows a user to pair real life objects with MAR objects. In embodiments, such pairing involves a user matching images of real life objects with images (e.g., stored images) of MAR objects. Such real life images may be captured, for example, through incoming video stream 231. Based on user selections (through user input device 208), correspondence between real objects and MAR objects and/or characters are stored in object profile database 212 and/or character profile database 213. Further, characteristics of the MAR objects (e.g., feature data used for recognizing real objects, and image data used for rendering MAR object images) may be generated and stored in object characteristics database 214.

Application processing module 220 performs operations corresponding to the MAR application. For example, operations may involve actions of a player's character (e.g., target acquisition and shooting), as well as actions of other characters and objects. Such operations may be based on user inputs made through user input device 208. Based on such operations, application processing module 220 may generate output directives 233, which are sent to video processing module 210. Output directives 233 may specify particular renderings and/or features for output video stream 232. Based on these directives, video processing module 210 performs corresponding operations in the generation of output video stream 232.

Communications interface module 222 provides for implementation 200 to exchange information with one or more remote entities. In the context of FIG. 1, such remote entities may include one or more of user platforms 102*a-n* and/or central processing segment 104. Such information may include information regarding user interactions and/or MAR application operations. Further, such information may include information of databases 212-214.

Moreover, such information may include communications (e.g., voice and/or text communications) between users/players. For instance, groups of users/players may communicate across one or more communications bands. Such communications bands may be employed for various user/player groupings. Exemplary groupings include team members, all users/players, users/players having characters within proximity of each other, etc. In embodiments, such communications bands may be altered or stopped by virtual actions within the MAR application. For example, an attack by one team "breaks" the communication band of the other team. Additionally or alternatively, communication band(s) may be enhanced with audio representing virtually audible events (e.g., gun shots, explosions, etc.) from the MAR application.

Accordingly, communications interface module 222 may include control logic to operate in accordance with one or more communications protocols. Moreover, communications interface module 408 may include various elements, including (but not limited to) transceiver(s), modulators, demodulators, upconverters, downconverters, mixers, buffers, filters, and/or amplifiers.

Location determination module 224 determines a current location of implementation 200. Additionally, location determination module may store a history of the locations of one or more users. Based on this determination, various operations may be performed. Such operations may be based on the locations of objects and/or characters provided by the MAR application. Further, this determined location may sent to remote devices (through communications interface module 222). In the context of FIG. 1, such devices may include one or more of user platforms 102*a-u* and/or central processing segment 104. Location determination module 224 may be implemented in various ways. For example, location determination module 224 may include a global positioning system (GPS) receiver.

Orientation determination module 225 determines a current positional orientation of implementation 300. More particularly, orientation determination module 225 may determine a viewing perspective of the corresponding user platform. Various techniques may be employed to provide such features. For instance, orientation determination module 225 may include components, such as accelerometer(S) and/or gyrometer(s).

Figure 3:
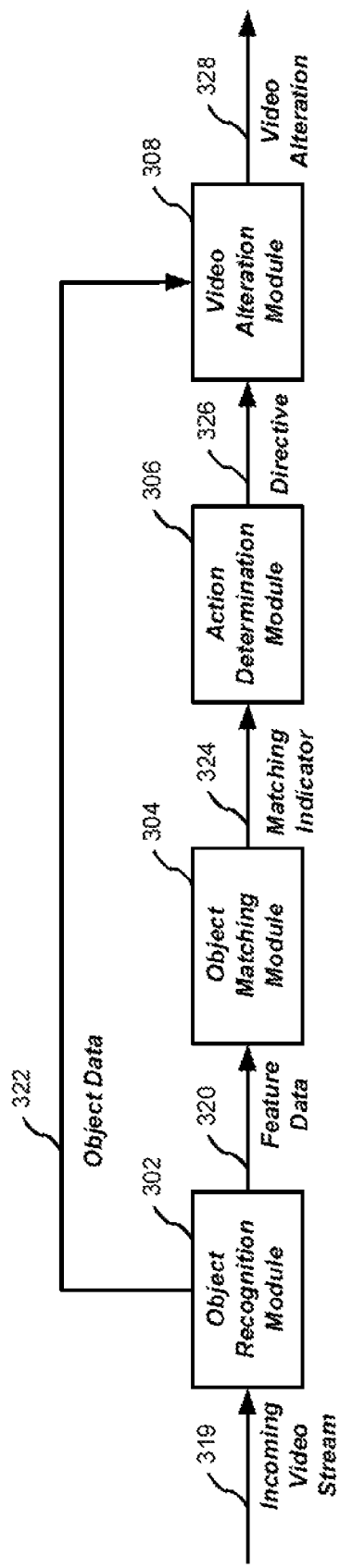
FIG. 3 is a diagram of an exemplary implementation that may be included in a video processing module.

As described above, video processing module 210 may generate output video stream 232 to include one or more alternations. Such alterations may convey overlaid images of MAR objects. FIG. 3 is a diagram of an exemplary implementation 300 that may generate such alterations. In embodiments, this implementation may be included in video processing module 210 of FIG. 2. As shown in FIG. 3, implementation 300 may include an object recognition module 302, an object matching module 304, an action determination module 306, and a video alteration module 308. These elements may be implemented in any combination of hardware and/or software.

Object recognition module 302 recognizes (detects) objects within an incoming video stream 319. In the context of FIG. 2, this video stream may be incoming video stream 231. With such detection, object recognition module 302 may generate corresponding feature data 320 that describes characteristics of the detected object. Feature data 320 is sent to object matching module 304. Moreover, object recognition module 302 may track such detected objects over time. This tracking may involve repeatedly determining characteristics (e.g., size, position, orientation, etc.) of such objects. FIG. 2 shows that such characteristics may be sent to video alteration module 308 as object data 322.

As described above, object matching module 304 receives feature data 320. In turn, object matching module 304 may determine whether this data matches (or corresponds to) feature data within a feature database (e.g., object characteristics database 214). When this occurs, a matching indicator 324 is generated. This matching indicator may include an identifier of the matched object.

Based on the existence of an object match, various operations may be performed. For example, upon receipt of matching indicator 324, action determination module 306 may determine whether any video alterations are to be performed. In embodiments, this may comprise action determination module 306 accessing a profile of the matched object (e.g., within object profile database 212 and/or character profile database 213), and retrieving a corresponding action (if any) provided by the profile. In turn, action determination module 306 may send a directive 326 to video alteration module 308 that indicates the action (if any) to be performed.

Upon receipt of directive 326, video alteration module 308 may perform the directed alteration. As described herein, this may involve overlaying an image of an object onto a detected object. Accordingly, video alteration module 308 may retrieve information regarding the object to be overlaid. In the context of FIG. 2, such information may be retrieved from object characteristics database 214. Based on this retrieved information and object data 322, video alteration module 308 may generate a video alteration 328, which is to be sent to a user output device. For example, in the context of FIG. 2 video alteration 328 may be included in output video stream 232.

The features of FIGS. 2 and 3 are described in the context of a user platform. However, it is worthy to note that these features may be allocated in various ways to one or more platforms. For example, maintained information (e.g., in databases 212-214) may be allocated among various device(s), such as a central device (e.g., central processing segment 104) and/or one or more user platforms. Accordingly, such information may be maintained, propagated, and/or distributed in various manners. Likewise, one or more of the operational features described above with reference to FIGS. 2 and 3 may be allocated among various device(s), such as a a central device and/or one or more user platforms.

Figure 4:
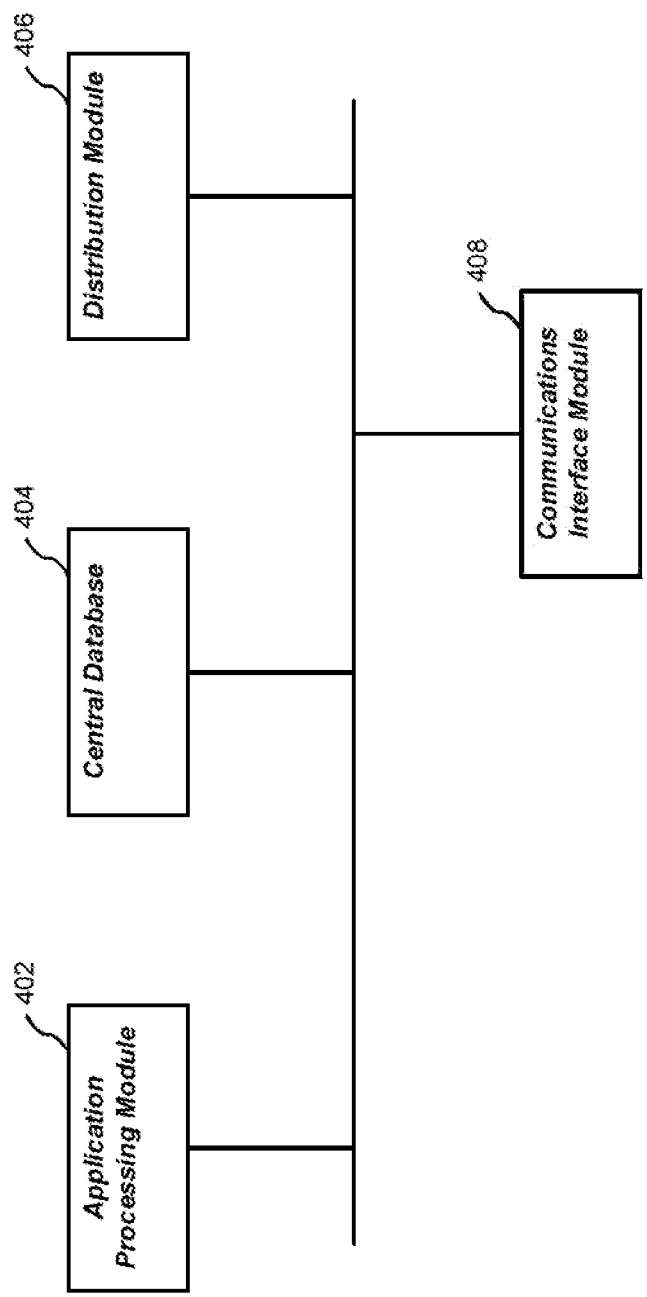
FIG. 4 is a diagram of an exemplary implementation that may be included in a central processing segment.

FIG. 4 is a diagram showing an exemplary implementation 400 that may be included in central processing segment implementation 104. As shown in FIG. 4, implementation 400 may include an application processing module 402, a central database 404, a distribution module 406, and a communications interface module 408. These elements may be implemented in any combination of hardware and/or software.

Application processing module 402 performs operations corresponding to a MAR application. Such operations may involve one or more characters and/or objects. In embodiments, such operations may be in response to information received from one or more user platforms. Further, such operations may generate information that may be employed by one or more user platforms. Such information may be stored locally (e.g., within central database 404). Alternatively, such information may be distributed to the one or more user platforms.

Central database 404 stores information pertaining to a MAR application. For example, central database 404 may store information regarding, objects, characters, and so forth. hi embodiments, this information may include information stored in object profile database 212, object profile database 213, and/or object characteristics database 214. Application processing module 402 and/or user platform(s) may access and/or generate such information in the performance of various MAR application-related operations.

Distribution module 406 exchanges information with one or more user platforms. For instance, distribution module may receive information from a particular user platform and forward it to one or more other user platform(s). Additionally or alternatively, distribution module may store such received information in central database 404. Further, in embodiments, distribution module 406 may access information from central database 404 and provide such information to one or more user platforms.

Communications interface module 408 provides for the exchange of information across one or more networks (e.g., such as across communications infrastructure 106 of FIG. 1). Accordingly, communications interface module 408 may include control logic to operate in accordance with one or more communications protocols. Moreover, communications interface module 408 may include various elements, including (but not limited to) transceiver(s), modulators, demodulators, upconverters, downconverters, mixers, buffers, filters, and/or amplifiers.

Figure 5:
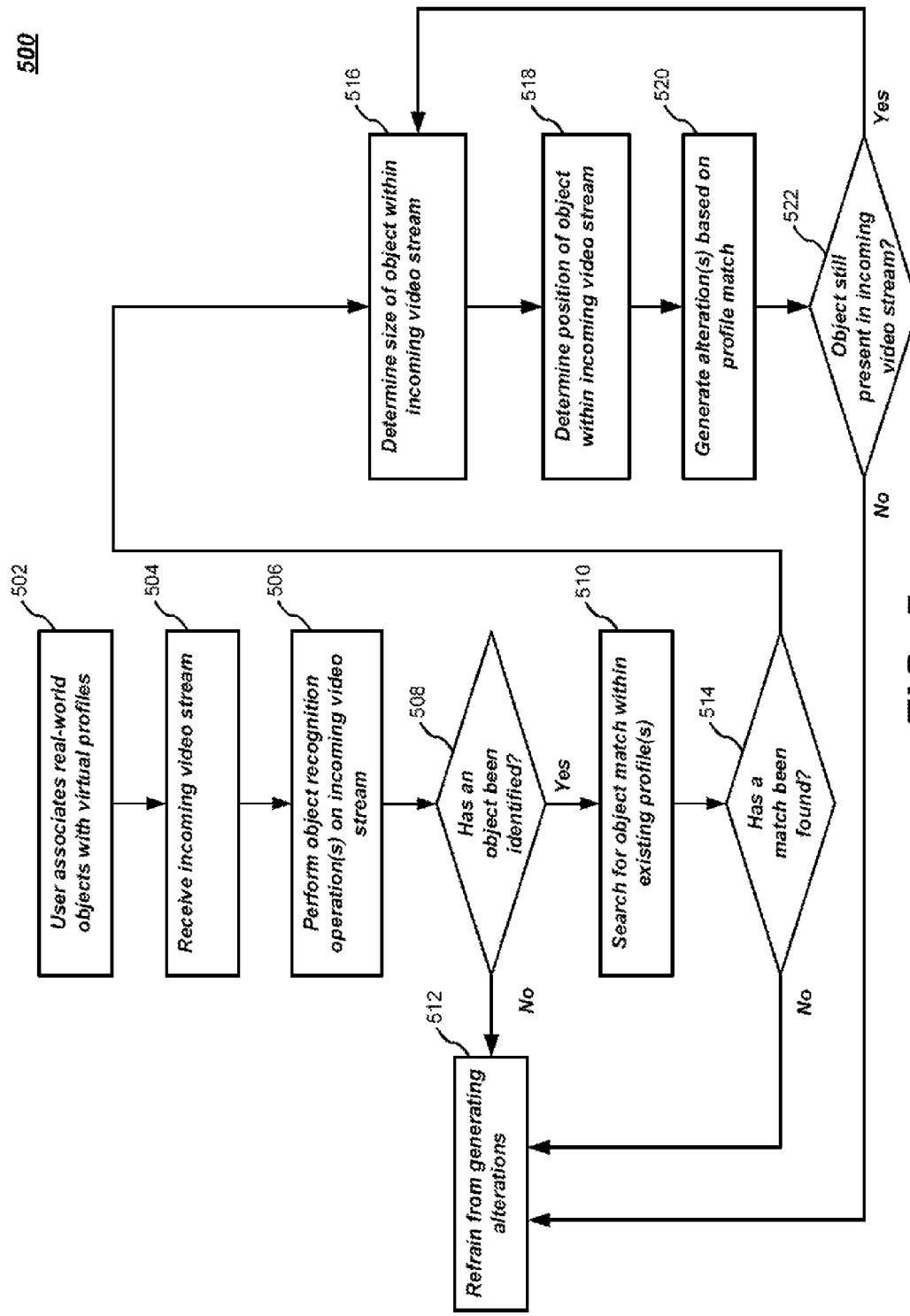
FIGS. 5-7 are logic flow diagrams.

FIG. 5 illustrates an exemplary logic flow 500, which may be representative of operations executed by one or more embodiments described herein. Thus, this flow may be employed in the contexts of FIGS. 1-4. Embodiments, however, are not limited to these contexts. Also, although FIG. 5 shows particular sequences, other sequences may be employed. Moreover, the depicted operations may be performed in various parallel and/or sequential combinations.

At a block 502, a user associates real-world objects with virtual profiles. Thus, through such associations, the user may specify how characters and objects that will behave (e.g., appear) in a MAR application. In the context of FIG. 2, this may involve the user creating such associations through user input device 208 and object association module 218.

At a block 504, an incoming video stream is received. This video stream comprises a sequence of images. The video stream may be received by the user's platform. For example, in the context of FIG. 2, this video stream may be incoming video stream 231.

At a block 506, one or more object recognition operations are performed on this incoming video stream. As shown in FIG. 5, it is determined (at a block 508) whether these operation(s) result in an object being identified. If so, then operation proceeds to a block 510. Otherwise, operation proceeds to a block 512, where the flow refrains from generating any alterations.

At block 510, a match for the object is sought. In embodiments, this may comprise comparing one or more features of the identified object with feature(s) corresponding to objects of existing profile(s). In the context of FIG. 2, this may comprise accessing object characteristics database 214.

As indicated by a block 514, operation proceeds to a block 516 if such a match is found. Otherwise, operation proceeds to block 512, where the flow refrains from generating any alterations.

At block 516, the size of the object within the incoming video stream is determined. Further, at a block 518, the position of the object (e.g., its coordinates) within the incoming video stream is determined. Based on this, alteration(s) are generated at a block 520. As described herein, such alteration(s) may be included in an output video stream. For instance, the output video stream may include such alterations being superimposed or overlaid on the object in the incoming video stream. Alternatively, the output video stream may include such alterations in isolation of the incoming video stream.

At a block 522, it is determined whether the object is still present in the incoming video stream. If so, then alteration of the video stream may continue. Accordingly, FIG. 5 shows that operation returns to block 516. However, if the object is no longer present in the incoming video stream, then operation proceeds to block 512, where the flow refrains from generating any alterations.

Figure 6:
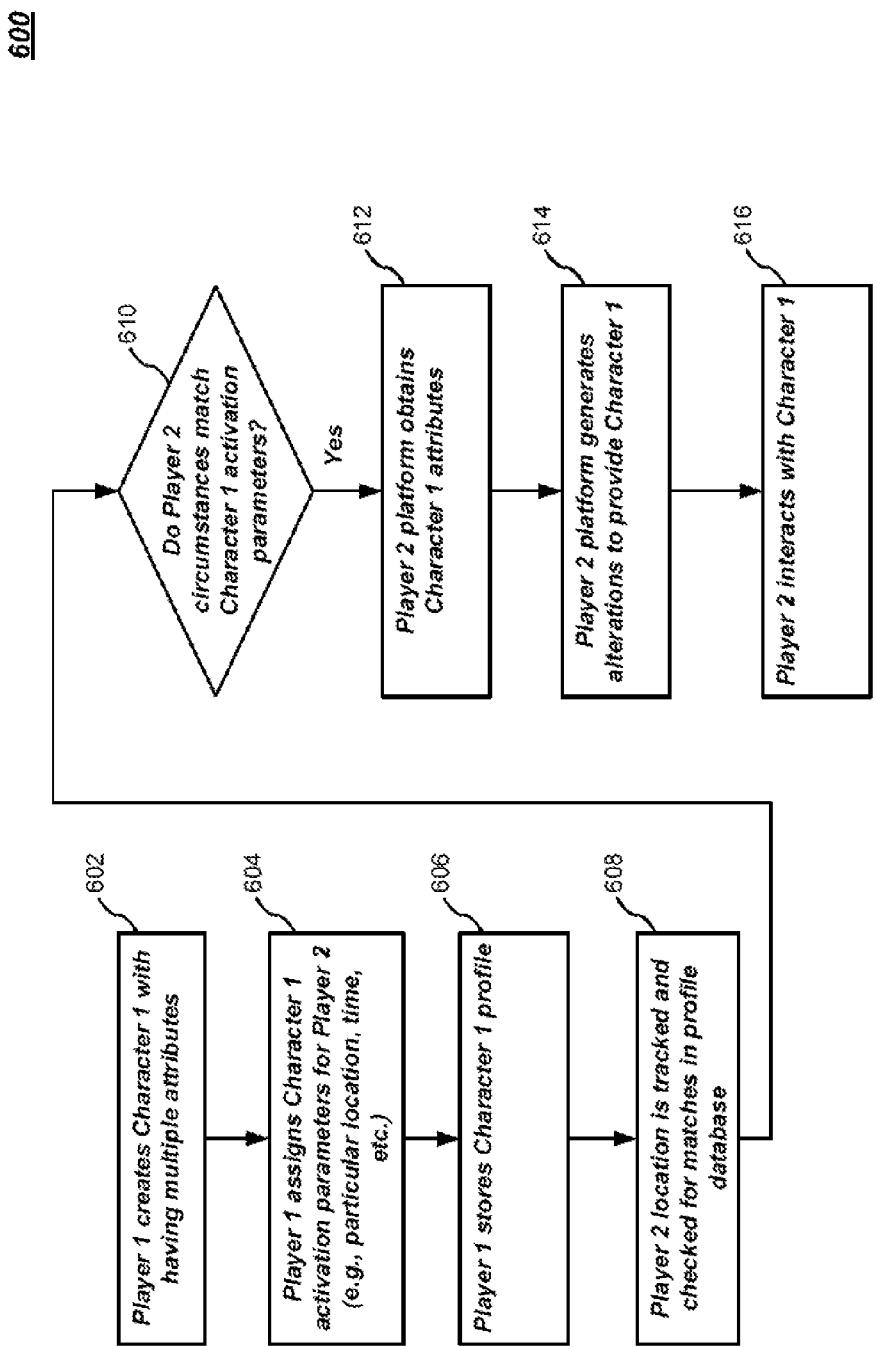

As described above, users may create virtual objects (e.g., characters) for MAR applications (e.g., games). In embodiments, such objects may appear when a circumstance of a user/player match activation parameter(s) for the created object. FIG. 6 illustrates an exemplary logic flow 600 providing an example of such techniques. This flow may be employed in the contexts of FIGS. 1-4. Embodiments, however, are not limited to these contexts. Also, although FIG. 6 shows particular sequences, other sequences may be employed. Moreover, the depicted operations may be performed in various parallel and/or sequential combinations.

This flow is described in the context of a two users: Player 1 and Player 2. In the context of FIG. 1, each of these players may operate a corresponding one of user platforms 102*a-n*. Embodiments, however, are not limited to this context.

At a block 602 Player 1 creates a Character 1 having multiple attributes. As indicated by a block 604, such attributes may include one or more activation parameters corresponding to Player 2. For example, these activation parameter(s) may include (but are not limited to) particular time(s) and/or locations(s) of Player 1 in which Character 1 will appear.

These Character 1 attributes are stored in a profile at a block 606. In the context of FIG. 2, this profile may be stored in character profile database 213. However, this profile may be stored in additional or alternative locations. For example, this profile may be stored centrally (e.g., in central processing segment 106). Additionally or alternatively, this profile may be propagated to one or more user platform, such as Player 2's user platform.

At a block 608, the circumstances of Player 2 are tracked and checked for character profile matches. A block 610 indicates that, if a match occurs between Player 2's circumstances and the activation parameter(s) of Character 1, then blocks 612 through 616 are performed.

For instance, at block 612. Player 2 obtains Character 1 attributes. These may be obtained locally or remotely. At block 614, Player 2's user platform generates alterations to render Character 1. In the context of FIG. 2, this may comprise video processing module 210 generating renderings/alterations. In turn, Player 2 may interact with Character 1 at a block 616.

As described above, alterations may be performed to make objects appear differently to users/players. For example, in embodiments, a user/player may initiate such alterations during play. For example, a user may pick up an object (e.g, a stick) and employ it as virtual a game object, such as a wand. Based on this action, alterations may be performed to make the stick may appear to users as the virtual game object. In embodiments, other users/players may make further changes to this object, for example, another user/player may make the object into a different game object, such as a sword.

Figure 7:
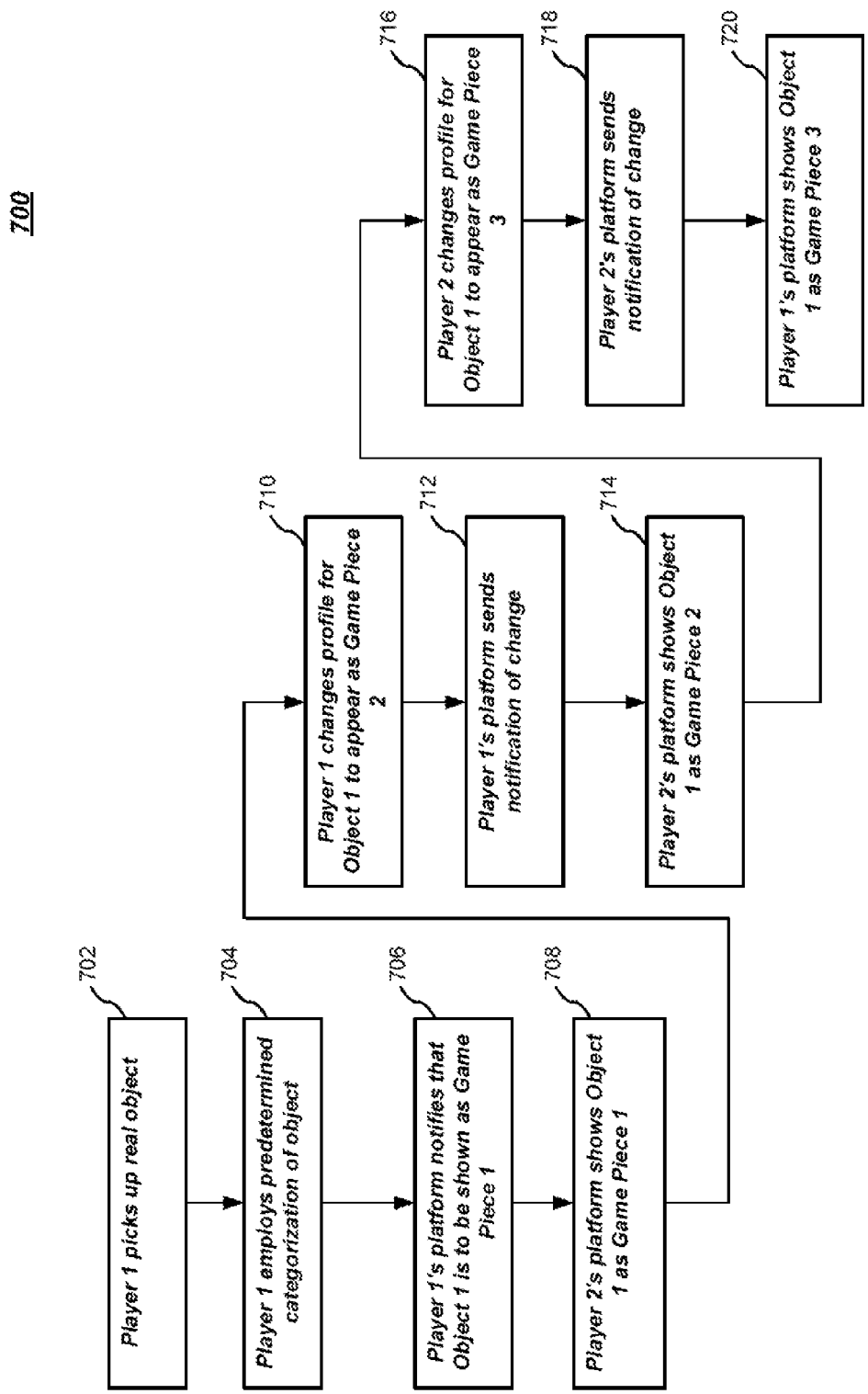

FIG. 7 illustrates an exemplary logic flow 700 providing an example of such techniques. This flow may be employed in the contexts of FIGS. 1-4. Embodiments, however, are not limited to these contexts. Also, although FIG. 7 shows particular sequences, other sequences may be employed. Moreover, the depicted operations may be performed in various parallel and/or sequential combinations.

This flow is described in the context of a two users: Player 1 and Player 2. In the context of FIG. 1, each of these players may operate a corresponding one of user platforms 102a-n. Embodiments, however, are not limited to this context.

At a block 702, Player 1 physically picks up a real-environment object (Object 1) and holds it in his/her hand. At a block 704, Player 1 applies a predetermined (e.g., default) categorization of Object 1 based on a stored object profile (e.g., a stick becomes a wand). In the context of FIG. 2, this profile may be stored at object profile database 212. Embodiments, however, are not limited to this context.

At a block 706, Player 1's platform notifies that Object 1 (e.g., a stick) will be shown as Game Piece 1 (e.g., a wand) by all user/player platforms. This may involve sending corresponding profile information to the other player platform(s) and/or a central entity (e.g., central processing segment 104 of FIG. 1). Accordingly, at a block 708, Player 2's platform shows Object 1 as Game Piece 1. This may involve generating alterations/renderings, as described herein.

However, at a block 710, Player 1 changes the profile for Object 1 to appear as Game Piece 2 (e.g., a gun). A notification of this change is sent to the other player platform(s) and/or a central entity at block 712. Accordingly, at a block 714, Player 2's platform shows Object 1 as Game Piece 2. This may involve generating alterations/renderings, as described herein.

Further, at a block 716, Player 2 changes the profile for Object 1 to appear differently, as Game Piece 3 (e.g., as a sword). A notification of this change is sent to the other player platform(s) and/or a central entity at block 718. Accordingly, at a block 720, Player 1's platform shows Object 1 as Game Piece 3. This may involve generating alterations/renderings, as described herein.

FIGS. 8 and 9 are diagrams showing arrangements of information that may be managed by embodiments. In the context of FIG. 1, such information may be stored, for example, in one or more of user platforms 102a-n. Alternatively or additionally, such information may be stored in central processing segment 104. However, embodiments are not limited to these examples.

FIG. 8 is a diagram showing an exemplary implementation 800 of object profile database 212. As described above, this database includes information regarding objects that may be identified within an incoming video stream. FIG. 8 shows information being arranged into rows $804_1$-$804_8$. Each of these rows provides an object profile having multiple items of information at columns $802_1$-$802_6$.

For instance, column $802_1$ indicates an object type, which may be identified in an incoming video stream. As examples, FIG. 8 provides the following exemplary object types: bush, tree, car, small truck, large truck, adult male, adult female, and child. These object types are provided for purposes of illustration and not limitation.

Column $802_2$ indicates a MAR object. In a display to a user, this MAR object may replace a detected object of the type indicated in column $802_1$. As described herein, such replacement may involve overlaying the MAR object on the identified object. For instance, row $804_2$ indicates that an image of a tower may replace a tree, when detected.

Column $802_3$ indicates the basis of the object type indicated in column $802_1$. As an example, FIG. 8 shows that a basis of real may be indicated. This denotes that the object is to be detected as a real object in an incoming video stream. Alternatively, a basis of out may be indicated. This denotes that an alteration removing the object from view is to be made.

A capability of the MAR object is indicated by column $802_4$. For example, FIG. 8 shows the capability being non-interactive, which indicates that a character in the MAR application can not interact with the object. In contrast, an interactive object is one with which a character can interact. For example, an interactive object may be one that is an implementation (e.g., an avatar) of a user/user platform.

Column $802_5$ provides appearance rules. Such rules indicate when the MAR object (of column $802_2$) is to be overlaid. As an example, FIG. 8 indicates the appearance rule of "on detection", which indicates that the MAR object is overlaid when a corresponding object of the type indicated by column $802_1$ is identified.

Column $802_6$ indicates a status of the profile. In particular, column $802_6$ may indicate whether the profile is active ("act") or dormant. When the profile is active, operations corresponding to the profile (e.g., object replacement) may be performed. However, when the profile is dormant, such operations are to be bypassed.

FIG. 9 is a diagram showing an exemplary implementation of character profile database 213. As described above, this database includes information regarding characters that may be generated by a MAR application.

FIG. 9 shows information being arranged into rows $904_1$-$904_{11}$. Each of these rows provides a character profile. Further, as shown in FIG. 9, each of these profiles includes multiple items of information at columns $902_1$-$902_8$.

For instance, column $902_1$ indicates a character identifier (ID). As shown in FIG. 9, this identifier may be numeric. Column $902_2$ indicates a character class. Exemplary character classes include player, monster, shield, gun, wand, and tank. Embodiments, however, are not limited to these examples.

Column $902_3$ provides a basis (such as real or virtual) for the character. A real basis indicates that there is a corresponding real object (such as an actual person) corresponding to the character. In contrast, a virtual basis indicates that there is not a real object corresponding to the character.

Column $902_4$ indicates a current location of the character. In embodiments, the location may be represented as latitude and longitude coordinates. However, other suitable location representations may be employed. Column $902_5$ indicates the character's capability or role. As examples, FIG. 9 shows the following values for this column: player, attacker, solid, blocker, basic, high, and all.

Column $902_6$ indicates appearance rules for the character. As described herein, such appearance rules may indicate when the character may be visible to players. Column $902_7$ indicates a status for the character. As shown in FIG. 9, exemplary status values include active (e.g., currently appearing) and dormant (e.g., not currently appearing).

Column $902_8$ indicates the character's strength. In embodiments, strength may be used to determine the relative efficacy of the character against other characters.

Figure 10A:
FIGS. 10A-10C illustrate examples of alterations.
Figure 10B:
Figure 10C:
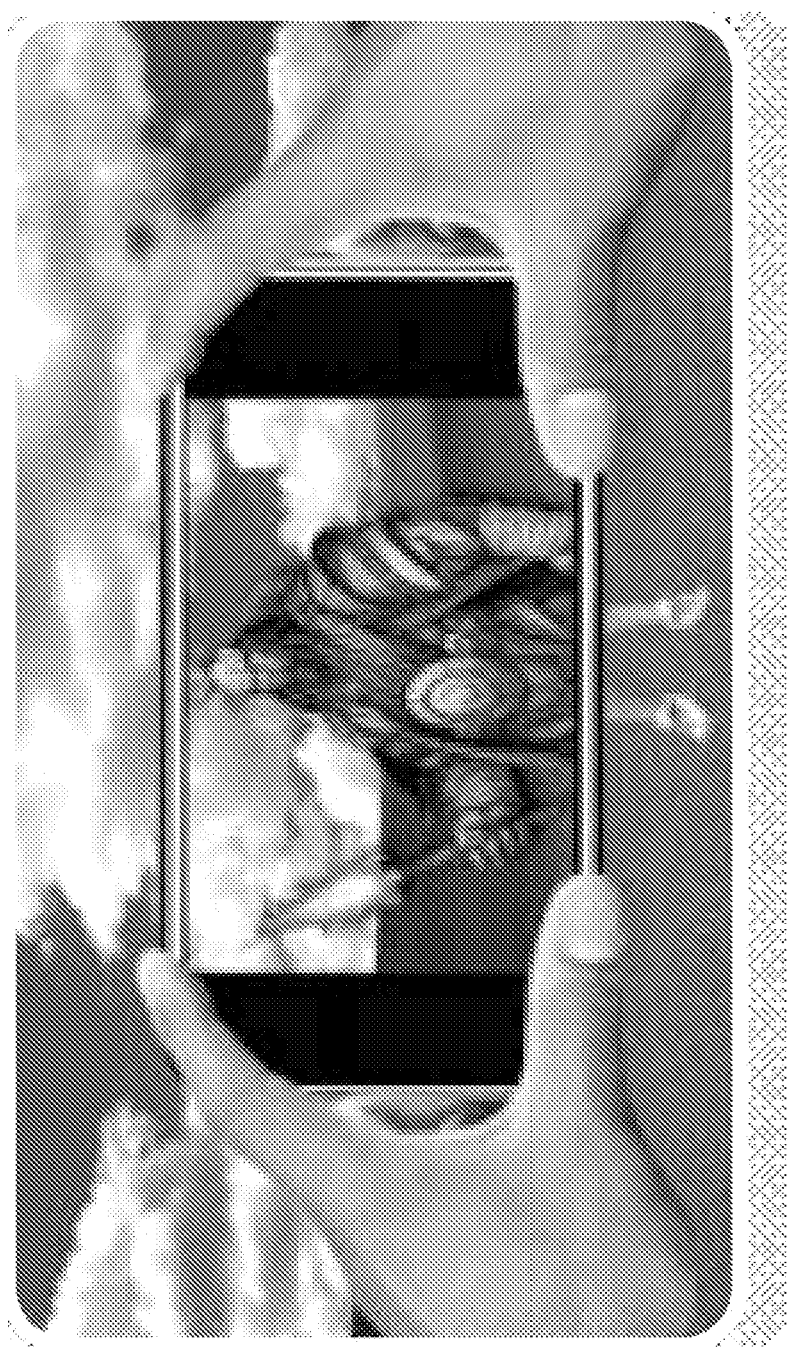

As described herein, embodiments may generate alterations that affect the appearance of real objects to a MAR application user. Examples of such alterations are illustrated in FIGS. 10A-10C. For instance, FIG. 10A shows a street vehicle being altered to appear as a military vehicle. FIGS. 10B and 10C show the appearances of persons being altered. These persons may be MAR application users (e.g., players). Alternatively, these persons may be non-user bystanders in the real environment. As described herein, such alterations may be based on stored profiles. In the context of FIG. 2, such profiles may be stored in object profile database 212 and/or character profile database 213. Moreover, data used for the rendering of such alterations may be stored in object characteristics database 214. Embodiments, however, are not limited to these examples.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software May include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
capturing a video stream using a wearable camera of a first platform to generate an incoming video stream;
identifying an object in one or more images from an incoming video stream and generating feature data describing size and position of the identified object in an object recognition module of the first platform;
matching the identified object to a profile in a character profile database, the character profile database including an action associated with the identified object;
based on a profile corresponding to the identified object in the character profile database, generating an alteration of the identified object including overlaying an image from the character profile database over the identified object in the incoming video stream;
displaying the alteration of the identified object at the first platform;
propagating the alteration to a second platform through a wireless communications interface of the first platform; and
display the alteration of the identified object at the second platform.

2. The method of claim 1, wherein said altering comprises:
receiving an incoming video stream, the incoming video stream including the one or more images; and
generating an output video stream, the output video stream including the alteration of the identified object.

3. The method of claim 1:
wherein the alteration of the identified object appears as a virtual object associated with a mobile augmented reality (MAR) application; and
wherein the profile includes an association between an object type of the identified object and the virtual object.

4. The method of claim 3, further comprising:
receiving the association from a user of the MAR application.

5. The method of claim 3, further comprising changing the association based on a user selection.

6. The method of claim 3, further comprising:
providing a communications band between two or more users of the MAR application, and
interrupting the communications band based on an event of the MAR application.

7. The method of claim 6, wherein the communications band provides for audio communications among the two or more users.

8. The method of claim 1, wherein the identified object is a character of a mobile augmented reality (MAR) application, and wherein the alteration changes an appearance of the character.

9. The method of claim 1, wherein the alteration comprises a removal of the identified object.

10. The method of claim 1, wherein the identified object is an object being handled by a user of a mobile augmented reality (MAR) application.

11. The method of claim 1, further comprising:
providing one or more activation parameters for a virtual object; and when a circumstance of a mobile augmented reality (MAR) application user matches the one or more activation parameters, rendering the virtual object in the output video stream.

12. The method of claim 11, wherein the one or more activation parameters includes a location and/or a time.

13. An apparatus comprising:
a wearable camera to capture a video stream to generate an incoming video stream;
a storage medium to store an association between a real object type and a virtual object in an object association module and to store a character profile database having profiles and actions associated with identified objects;
a video processing module to identify a real object within the incoming video stream to generate feature data describing size and position of the identified object, to match the identified object to a profile in the character profile database, and to, based on the association, generate an alteration to the object for an output video stream including overlaying an image from the character profile database over the identified object in the incoming video stream; and
a wireless communications interface to propagate the alteration to a second apparatus for display of the alternation of the identified object at the second apparatus.

14. The apparatus of claim 13, further comprising an output device to display the alteration.

15. The apparatus of claim 13, wherein the object is a character of a mobile augmented reality (MAR) application.

16. The apparatus of claim 13:
wherein the associated actions comprise one or more activation parameters for a virtual object; and
wherein the video processing module is to render the virtual object when a circumstance of a mobile augmented reality (MAR) application user matches the one or more activation parameters.

17. A system, comprising:
a plurality of user platforms to provide a mobile augmented reality (MAR) application for a corresponding plurality of users, wherein each of the user platforms includes:
a wearable camera to capture a video stream to generate an incoming video stream;
a storage medium to store an association between a real object type and a virtual object in an object association module and to store a character profile database having profiles and actions associated with identified objects; and
a video processing module to identify a real object within the incoming video stream to generate feature data describing size and position of the identified object, to match the identified object to a profile in the character profile database, and to, based on the association, generate an alteration to the object for an output video stream including overlaying an image from the character profile database over the identified object in the incoming video stream; and
a wireless communications interface to propagate the alteration to a second user platform for display of the alteration of the identified object at the second user platform.

18. The system of claim 17, wherein a first of the user platforms receives an alert when a user of a second of the plurality of user platforms encounters a character placed by a user of the first user platform at a remote location.

19. The system of claim 17, wherein a first of the user platforms and a second of the user platforms is each to display an object having results, the results from users of the first and second user platforms.

20. An article comprising a non-transitory machine-accessible medium having stored thereon instructions that, when executed by a machine, cause the machine to perform operations comprising:
capturing a video stream using a wearable camera of a first platform to generate an incoming video stream;
identifying an object in one or more images from an incoming video stream and generating feature data describing size and position of the identified object in an object recognition module of the first platform;
matching the identified object to a profile in a character profile database, the character profile database including an action associated with the identified object;
based on the profile corresponding to the identified object in the character profile database, generating an alteration of the identified object including overlaying an image from the character profile database over the identified object in the incoming video stream;
displaying the alteration of the identified object at the first platform; and
propagating the alteration to a second platform through a wireless communications interface of the first platform for display of the alteration of the identified object at the second platform.

* * * * *